US012592378B2

(12) United States Patent
Wang et al.

(10) Patent No.: US 12,592,378 B2
(45) Date of Patent: Mar. 31, 2026

(54) NEGATIVE ELECTRODE PLATE AND PREPARATION METHOD THEREOF, SECONDARY BATTERY, BATTERY MODULE, BATTERY PACK, AND ELECTRICAL APPARATUS

(71) Applicant: CONTEMPORARY AMPEREX TECHNOLOGY (HONG KONG) LIMITED, Hong Kong (CN)

(72) Inventors: Jiazheng Wang, Ningde (CN); Qingwei Yan, Ningde (CN); Liangbin Liu, Ningde (CN); Xiaobin Dong, Ningde (CN); Zijian Lv, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 17 days.

(21) Appl. No.: 18/430,676

(22) Filed: Feb. 2, 2024

(65) Prior Publication Data

US 2024/0170659 A1 May 23, 2024

Related U.S. Application Data

(63) Continuation of application No. PCT/CN2022/095235, filed on May 26, 2022.

(51) Int. Cl.
| | |
|---|---|
| *H01M 4/13* | (2010.01) |
| *H01M 4/133* | (2010.01) |

(Continued)

(52) U.S. Cl.
CPC ........... *H01M 4/134* (2013.01); *H01M 4/133* (2013.01); *H01M 4/139* (2013.01); *H01M 4/366* (2013.01);
(Continued)

(58) Field of Classification Search
None
See application file for complete search history.

(56) References Cited

U.S. PATENT DOCUMENTS

| | | | |
|---|---|---|---|
| 2015/0044571 A1* | 2/2015 | Abdelsalam | ........ H01M 4/0404 252/182.1 |
| 2018/0040880 A1 | 2/2018 | Andersen et al. | |
| 2021/0391579 A1 | 12/2021 | Haldar | |

FOREIGN PATENT DOCUMENTS

| | | |
|---|---|---|
| CN | 104347842 A | 2/2015 |
| CN | 108346523 A | 7/2018 |

(Continued)

OTHER PUBLICATIONS

Machine translation of CN 109888266 A.*

(Continued)

*Primary Examiner* — Jonathan G Leong
*Assistant Examiner* — Tony S Chuo
(74) *Attorney, Agent, or Firm* — K&L Gates LLP

(57) ABSTRACT

Provided is a negative electrode plate, comprising: a negative electrode current collector and a first negative electrode active material layer. The first negative electrode active material layer is arranged on at least one surface of the negative electrode current collector, wherein, components of the first negative electrode active material layer comprise, by mass: 30%-70% of a silicon-based material, 15%-40% of a binder and 15%-40% of a conductive agent.

11 Claims, 3 Drawing Sheets

(51) Int. Cl.

| | |
|---|---|
| *H01M 4/134* | (2010.01) |
| *H01M 4/139* | (2010.01) |
| *H01M 4/36* | (2006.01) |
| *H01M 4/48* | (2010.01) |
| *H01M 4/587* | (2010.01) |
| *H01M 4/62* | (2006.01) |
| *H01M 4/02* | (2006.01) |

(52) U.S. Cl.

CPC ........... *H01M 4/483* (2013.01); *H01M 4/587* (2013.01); *H01M 4/622* (2013.01); *H01M 4/625* (2013.01); *H01M 2004/021* (2013.01); *H01M 2004/027* (2013.01)

(56) References Cited

FOREIGN PATENT DOCUMENTS

| | | | |
|---|---|---|---|
| CN | 109888266 | A | 6/2019 |
| CN | 110707288 | A | 1/2020 |
| CN | 111628141 | A | 9/2020 |
| CN | 113013379 | A | 6/2021 |
| CN | 113875051 | A | 12/2021 |
| CN | 114256501 | A | 3/2022 |
| EP | 4228042 | A1 | 8/2023 |
| JP | 2007035434 | A | 2/2007 |
| JP | 2013229163 | A | 11/2013 |
| JP | 2015179592 | A | 10/2015 |
| JP | 2016028375 | A | 2/2016 |
| KR | 20170121283 | A | 11/2017 |
| KR | 20210113589 | A | 9/2021 |
| KR | 20210143980 | A | 11/2021 |
| KR | 20210153997 | A | 12/2021 |
| WO | 2010038609 | A1 | 4/2010 |
| WO | 2021235794 | A1 | 11/2021 |

OTHER PUBLICATIONS

Machine translation of CN 114256501 A.*

The Extended European Search Report of the patent family application No. EP22938763.4, issued on Dec. 2, 2024 from the EPO.

The First Office Action of the patent family application No. JP2023-554048, issued on Oct. 15, 2024 from the JPO.

International Search Report received in the corresponding international application PCT/CN2022/095235, mailed on Sep. 20, 2022.

Written Opinion received in the corresponding international application PCT/CN2022/095235, mailed on Sep. 20, 2022.

The First Office Action of the counterpart KR application No. KR10-2023-7042259, dated Mar. 28, 2025, 15 pages with English translation.

The Final Office Action of the counterpart KR application No. KR10-2023-7042259 , dated Jun. 10, 2025, 15 pages with English translation.

Notice of Allowance (with English Machine Translation), mailed Aug. 20, 2025, for corresponding Korean Patent Application Serial No. 10-2023-7042259.

Office Action (with English Machine Translation), mailed Aug. 14, 2025, for corresponding Chinese Patent Application Serial No. 202280044752.0.

The Notice of Allowance of the counterpart CN application No. 202280044752.0, dated Feb. 9, 2026, 3 pages with English translation.

* cited by examiner

5

5

NEGATIVE ELECTRODE PLATE AND PREPARATION METHOD THEREOF, SECONDARY BATTERY, BATTERY MODULE, BATTERY PACK, AND ELECTRICAL APPARATUS

CROSS REFERENCE TO RELATED MATTER

This application is a continuation of international application PCT/CN2022/095235, filed May 26, 2022 and entitled "NEGATIVE ELECTRODE PLATE AND PREPARATION METHOD THEREOF, SECONDARY BATTERY, BATTERY MODULE, BATTERY PACK, AND ELECTRICAL APPARATUS", the entire content of which is hereby incorporated by reference in its entirety.

TECHNICAL FIELD

The present application relates to the field of secondary batteries, in particular to a negative electrode plate, a preparation method thereof, a secondary battery, a battery module, a battery pack and an electrical apparatus.

BACKGROUND ART

Negative electrode materials of secondary batteries such as a lithium-ion battery are usually based on carbon materials, such as natural graphite and artificial graphite. However, a capacity of the carbon materials is close to its theoretical capacity (372 mAh/g), which limits improvement on the capacity of the secondary batteries. As one of the negative electrode materials of the secondary batteries, silicon has attracted widespread attention due to its high theoretical specific capacity (4200 mAh/g), environmental friendliness, abundant reserves and other characteristics. However, a large volume change caused by deintercalation of lithium and an unstable solid electrolyte film formed on a surface lead to deterioration of a silicon-containing negative electrode plate in charge and discharge processes, and a poor cycle stability, thus limiting the use of the silicon-containing negative electrode plate in the secondary batteries.

SUMMARY OF THE INVENTION

Based on the above problem, the present application provides a negative electrode plate, a preparation method thereof, a secondary battery, a battery module, a battery pack, and an electrical apparatus, which can reduce volume expansion of the negative electrode plate, and improve cycling performance of the negative electrode plate.

An aspect of the present application provides a negative electrode plate, comprising:

a negative electrode current collector; and a first negative electrode active material layer, arranged on at least one surface of the negative electrode current collector; wherein, components of the first negative electrode active material layer comprise, by mass: 30%-70% of a silicon-based material, 15%-40% of a binder and 15%-40% of a conductive agent.

The above negative electrode plate, through a reasonable ratio of the components of the first negative electrode active material layer, makes the silicon-based material in the negative electrode plate have a smaller volume expansion during the charge-discharge cycle, thereby avoiding deterioration of the negative electrode plate and improving a cycle expansion rate and cycle life of the negative electrode plate.

In some of these embodiments, the binder and the conductive agent form a porous conductive network; and the porous conductive network wraps the silicon-based material.

In some of these embodiments, on a section perpendicular to a thickness direction of the first negative electrode active material layer, an area ratio of the silicon-based material to the porous conductive network is 1:(0.5-1.5).

In some of these embodiments, the silicon-based material includes at least one of monatomic silicon, a silicon-oxygen compound, a silicon-carbon composite, a silicon-nitrogen composite, a silicon alloy, and a pre-lithiated silicon-oxygen compound.

In some of these embodiments, a volume particle size Dv50 of the silicon-based material is 1 μm to 15 μm.

In some of these embodiments, the volume particle size Dv50 of the silicon-based material is 4 μm to 8 μm.

In some of these embodiments, among the components of the first negative electrode active material layer, a mass percentage of the silicon-based material is 45% to 55%.

In some of these embodiments, a glass transition temperature of the binder is less than or equal to 25° C.

In some of these embodiments, the binder includes at least one of styrene butadiene rubber, modified styrene butadiene rubber, an acrylate compound and butadiene.

In some of these embodiments, among the components of the first negative electrode active material layer, a mass percentage of the binder is 18% to 23%.

In some of these embodiments, among the components of the first negative electrode active material layer, a mass percentage of the conductive agent is 25% to 35%.

In some of these embodiments, the conductive agent includes at least one of superconducting carbon, acetylene black, ketjen black, conductive carbon black, graphene, carbon dots, carbon nanotubes, carbon nanofiber and graphite.

In some of these embodiments, the conductive agent includes graphite, conductive carbon black, and carbon nanotubes.

In some of these embodiments, a mass percentage of the graphite in the conductive agent is 85% to 97%.

In some of these embodiments, a volume particle size Dv50 of the graphite is 1 μm to 20 μm.

In some of these embodiments, the volume particle size Dv50 of the graphite is 2 μm to 4 μm.

In some of these embodiments, the negative electrode plate further includes: a second negative electrode active material layer; and the second negative electrode active material layer comprises a second negative electrode active material, and the second negative electrode active material comprises at least one of graphite, soft carbon, hard carbon, a tin-based material, lithium titanate, and a silicon-containing active material.

In some of these embodiments, the second negative electrode active material is graphite.

A second aspect of the present application further provides a preparation method of a negative electrode plate, comprising the following steps:

preparing a silicon-based material, a conductive agent and a binder into negative electrode slurry; and coating the negative electrode slurry on at least one surface of a negative electrode current collector, and drying the coated negative electrode slurry to prepare a first negative electrode active material layer; wherein components of the first negative electrode active material layer comprise, by mass: 30%-70% of the silicon-based material, 15%-40% of the binder and 15%-40% of the conductive agent.

A third aspect of the present application further provides a secondary battery, including the above negative electrode plate or the negative electrode plate prepared according to the above preparation method of the negative electrode plate.

A fourth aspect of the present application further provides a battery module, comprising the above secondary battery.

A fifth aspect of the present application further provides a battery pack, comprising the above battery module.

A sixth aspect of the present application further provides an electrical apparatus, comprising at least one selected from the above secondary battery, the above battery module, or the above battery pack.

The details of one or more embodiments of the present application are set forth in the accompanying drawings and the description below, and other features, objectives, and advantages of the present application will become apparent from the specification, the accompanying drawings, and the claims.

DESCRIPTION OF REFERENCE NUMERALS

Figure 1:
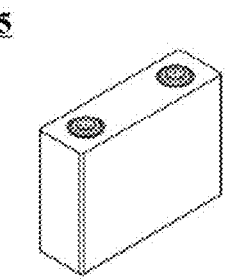
FIG. 1 is a schematic diagram of a secondary battery according to an implementation of the present application.

1 Battery pack; 2 Upper box body; 3 Lower box body; 4 Battery module; 5 Secondary battery; 51 Case; 52 Electrode assembly; 53 Cover plate; and 6 Electrical apparatus.

In order to better describe and illustrate embodiments and/or examples of the inventions disclosed herein, reference may be made to one or more of the accompanying drawings. Additional details or examples used to describe the accompanying drawings should not be considered limitations on the scope of any of the disclosed inventions, the presently described embodiments and/or examples, and the best mode of these inventions currently understood.

DETAILED DESCRIPTION

In order to facilitate the understanding of the present application, the present application will be described more fully below with reference to the relevant accompanying drawings. Preferred examples of the present application are shown in the accompanying drawings. However, the present application may be implemented in many different forms and is not limited to the embodiments described herein. On the contrary, the purpose of providing these embodiments is to make the understanding of the disclosed content of the present application more thorough and comprehensive.

Unless otherwise defined, all technical and scientific terms used herein have the same meaning as commonly understood by those skilled in the art to which this application belongs. The terms used herein in the specification of the present application are only for the purpose of describing specific embodiments, and are not intended to limit the present application. The term "and/or" includes any and all combinations of one or more of the associated listed items.

As a traditional negative electrode active material for a secondary battery, the capacity of a carbon material is close to its theoretical capacity (372 mAh/g), which limits the improvement on the capacity of the secondary battery. Due to its high theoretical specific capacity (4200 mAh/g), silicon is expected to become a new generation of negative electrode active material, which improves the capacity of the secondary battery. However, due to a large volume effect of a silicon-based material, when used in a negative electrode plate, the large volume expansion during the cycle will lead to problems such as film release, powder falling, and wrinkling of the electrode plate, and performance will deteriorate seriously. Therefore, in most cases, it can only be used by mixing with the carbon material, and a use ratio of the silicon-based material is greatly limited, and a silicon content is usually below 15 wt %.

An inventor of the present application has researched and invented that by arranging a negative electrode active material layer containing 30 wt %-70 wt % silicon-based material, and increasing the amount of a binder and a conductive agent in the negative electrode active material layer, volume expansion of silicon in a charging process can be effectively reduced, an irreversible volume change of the negative electrode plate is reduced, and therefore, the negative electrode plate has a lower cycle expansion rate and a longer cycle life. In addition, since the content of the silicon in the negative electrode active material layer is relatively high, energy density of the negative electrode plate can be improved.

The present application provides a negative electrode plate, a preparation method thereof, as well as a secondary battery, battery module, battery pack and electrical apparatus using the negative electrode plate. This type of secondary battery is applicable to various electrical apparatuses that use batteries, such as a mobile phone, a portable device, a laptop, a battery car, an electric toy, an electric tool, an electric vehicle, a ship, and a spacecraft. For example, the spacecraft includes an airplanes, a rocket, a space shuttle, a spaceship and the like.

An implementation of the present application provides a negative electrode plate, including a negative electrode current collector, and a first negative electrode active material layer.

The first negative electrode active material layer is arranged on at least one surface of the negative electrode current collector. As an example, the negative electrode current collector has two surfaces opposite in its own thickness direction, and the negative electrode active material layer is arranged on either or both of the two opposite surfaces of the negative electrode current collector.

Components of the first negative electrode active material layer include, by mass: 30%-70% of a silicon-based material, 15%-40% of a binder and 15%-40% of a conductive agent.

The above negative electrode plate, through a reasonable ratio of the components of the first negative electrode active material layer, makes the silicon-based material in the negative electrode plate have a smaller volume expansion during the charge-discharge cycle, thereby avoiding deterioration of the negative electrode plate and improving a cycle expansion rate and cycle life of the negative electrode plate.

Optionally, among the components of the first negative electrode active material layer, a mass percentage of the silicon-based material is 30%, 35%, 40%, 45%, 50%, 55%, 60%, 65% or 70%. Furthermore, among the components of the first negative electrode active material layer, the mass percentage of the silicon-based material is 45% to 55%. When the mass percentage of the silicon-based material is within the above range, overall performance of the negative electrode plate is better.

Since the first negative electrode active material layer includes the silicon-based material with the mass percentage of 30% to 70%, a relatively high content of binder is required to restrain the volume expansion of the silicon-based material in charging and discharging processes, thereby maintaining a good mechanical property. If the binder content is too low, a capability to inhibit expansion is relatively weak, while if the binder content is too high, the electrical conductivity of the negative electrode plate is affected, and an internal resistance of the electrode plate is increased. Optionally, among the components of the first negative electrode active material layer, a mass percentage of the binder is 15%, 20%, 25%, 30%, 35% or 40%. Furthermore, among the components of the first negative electrode active material layer, the mass percentage of the binder is 18% to 23%.

In the first negative electrode active material layer, the electrical conductivity of both the silicon-based material and the binder is poor, and a conductive agent is needed to improve the electrical conductivity of the negative electrode plate and reduce the internal resistance of the negative electrode plate. Optionally, among the components of the first negative electrode active material layer, a mass percentage of the conductive agent is 15%, 20%, 25%, 30%, 35% or 40%. Furthermore, among the components of the first negative electrode active material layer, the mass percentage of the conductive agent is 25% to 35%.

In some of these embodiments, the binder and the conductive agent form a porous conductive network; and the porous conductive network wraps the silicon-based material. Since the porous conductive network formed by the binder and the conductive agent wraps the silicon-based material, the volume expansion of the silicon-based material in the charging process can be effectively reduced, due to the higher content of the binder, the porous conductive network has the better mechanical property, and its structure is not prone to being damaged by the expansion of the silicon-based material. At the same time, the porous conductive network shrinks in the discharging process, thus greatly reducing the irreversible volume change of the negative electrode plate. The porous conductive network formed by the binder and the conductive agent further has the high electrical conductivity, which can effectively improve the problem of increased internal resistance caused by the higher content of the silicon-based material and the binder. In addition, the porous conductive structure can further accelerate electrolyte infiltration and improve the ionic conductivity of the electrode plate.

In some of these embodiments, on a section perpendicular to a thickness direction of the first negative electrode active material layer, an area ratio of the silicon-based material to the porous conductive network is 1:(0.5-1.5). The area ratio of the silicon-based material to the porous conductive network may be obtained by analyzing a scanning electron microscope (SEM) view of the electrode plate section. By controlling the area ratio of the silicon-based material and the porous conductive network within the above range, the irreversible volume change of the negative electrode plate is small, thereby having the better cycle stability. Optionally, on the section perpendicular to the thickness direction of the first negative electrode active material layer, the area ratio of the silicon-based material to the porous conductive network is 1:0.5, 1:0.6, 1:0.7, 1:0.8, 1:0.9, 1:1.0, 1:1.2 and 1:1.5. Furthermore, on the section perpendicular to the thickness direction of the first negative electrode active material layer, the area ratio of the silicon-based material to the porous conductive network is 1:(1.1-1.5).

In some of these embodiments, the silicon-based material includes at least one of monatomic silicon, a silicon-oxygen compound, a silicon-carbon composite, a silicon-nitrogen composite, a silicon alloy, and a pre-lithiated silicon-oxygen compound.

In some of these embodiments, a volume particle size $Dv50$ of the silicon-based material is 1 $\mu m$ to 15 $\mu m$. $Dv50$ refers to a particle size corresponding to 50% in volume distribution. As an example, $Dv50$ may be conveniently measured with a laser particle size analyzer with reference to GB/T 19077-2016 particle size distribution laser diffraction method, such as a Mastersizer 2000E laser particle size analyzer of Malvern Instruments Co., Ltd., UK. By adjusting the volume particle size $Dv50$ of the silicon-based material within the above range, slurry preparation of the negative electrode plate may be facilitated; and if $Dv50$ of the silicon-based material is too small, it is not conducive to the preparation of slurry, and if the $Dv50$ of the silicon-based material is too large, its electrical conductivity will be deteriorated. Optionally, the volume particle size $Dv50$ of the silicon-based material is 1 $\mu m$, 2 $\mu m$, 3 $\mu m$, 4 $\mu m$, 5 $\mu m$, 6 $\mu m$, 7 $\mu m$, 8 $\mu m$, 9 $\mu m$, 10 $\mu m$, 11 $\mu m$, 12 $\mu m$, 13 $\mu m$, 14 $\mu m$ or 15 $\mu m$. Furthermore, the volume particle size $Dv50$ of the silicon-based material is 4 $\mu m$ to 8 $\mu m$.

In some of these embodiments, the binder includes a flexible binder with a glass transition temperature being less than or equal to 25° C. By selecting a flexible binder with a lower glass transition temperature, it may be in a high elastic state in a relatively wide temperature range, has a high elastic limit and a large elongation at break, and can effectively control the volume expansion of the negative electrode plate by matching the silicon-based material with the larger volume change.

In some of these embodiments, the flexible binder includes at least one of styrene butadiene rubber, modified styrene butadiene rubber, an acrylate compound and butadiene. Specifically, the acrylate compound optionally includes at least one of methyl acrylate, ethyl acrylate, butyl acrylate and lauryl acrylate.

In some of these embodiments, the binder further includes a rigid binder with the glass transition temperature being greater than 25° C. The rigid binder with the glass transition temperature being higher than 25° C. has high strength, and can suppress the expansion and pulverization of the silicon-based material to a large extent, and the negative electrode plate has a suitable flexibility, so that the first negative electrode active material layer is not prone to cracking and detaching.

In some of these embodiments, the rigid binder includes at least one of polyacrylic acid (PAA), polyacrylonitrile (PAN), sodium polyacrylate (PAAS), polyacrylamide (PAM), polyvinyl alcohol (PVA), sodium alginate (SA), polymethacrylic acid (PMAA) and carboxymethyl chitosan (CMCS).

In some of these embodiments, the binder includes, by mass percentage, 90%-100% of the flexible binder and 0-10% of the rigid binder. By controlling the ratio of the binder within the above range, the cycle expansion rate of the negative electrode plate is lower and the cycling performance is better.

In some of these embodiments, the conductive agent includes at least one of superconducting carbon, acetylene black, ketjen black, conductive carbon black, graphene, carbon dots, carbon nanotubes, carbon nanofiber and graphite.

Furthermore, the conductive agent includes graphite, conductive carbon black, and carbon nanotubes. The conductive carbon black not only has the good electrical conductivity, but also participates in deintercalation of lithium; the carbon nanotubes have the excellent electrical conductivity, and have a large length-diameter, which may improve the conductive contact with the silicon-based material; and the graphite also has the excellent electrical conductivity, and the cost is relatively low. By selecting the graphite, conductive carbon black and carbon nanotubes as the conductive agent, it is beneficial to ensure the electrical conductivity of the negative electrode plate while improving the volume expansion of the negative electrode plate.

The graphite has the better electrical conductivity and electrochemical property, and is low in cost, and thus may be used as the main conductive agent. In some of these embodiments, a mass percentage of the graphite in the conductive agent is 85% to 97%.

The conductive carbon black will participate in deintercalation of lithium in the charging and discharging processes, but the reversible part does not exceed 20%, therefore, a high content of the conductive carbon black will affect the cycling performance of the negative electrode plate. In some of these embodiments, a mass percentage of the conductive carbon black in the conductive agent is 1% to 14%.

Due to an overall linear structure of a carbon nanotube and a diameter of the tube being less than 10 nm, excessive use of the carbon nanotubes may affect the preparation of the slurry and result in poor processing performance. In some of these embodiments, a mass percentage of the carbon nanotubes in the conductive agent is 0.5% to 6%.

The inventor has found through research that the volume particle size of the graphite in the conductive agent will obviously affect the electrical conductivity of the negative electrode plate. If the volume particle size of the graphite is large, the resistance of the negative electrode plate will be relatively high. If the volume particle size of the graphite is small, it is conducive to the formation of a porous conductive network with the good electrical conductivity, and the resistance of the negative electrode plate will be relatively low. In some of these embodiments, a volume particle size Dv50 of the graphite is 1 μm to 20 μm. Optionally, the volume particle size Dv50 of the graphite is 1 μm, 3 μm, 5 μm, 8 μm, 10 μm, 12 μm, 15 μm, 16 μm, 18 μm or 20 μm. Furthermore, the volume particle size Dv50 of the graphite is 2 μm to 4 μm.

In some of these embodiments, the components of the first negative electrode active material layer further include, by mass percentage, 0.5%-2% of a dispersing agent. The dispersing agent may improve dispersion and distribution of the silicon-based material, the binder and the conductive agent in the first negative electrode active material layer. Optionally, among the components of the first negative electrode active material layer, a mass percentage of the dispersing agent is 0.5%, 0.7%, 1%, 1.3%, 1.5%, 1.8% or 2%. Furthermore, among the components of the first negative electrode active material layer, the mass percentage of the dispersing agent is 0.8% to 1.2%.

In some of these embodiments, the dispersing agent includes at least one of carboxymethylcellulose (CMC) and sodium carboxymethylcellulose (CMC-Na).

In some of these embodiments, the negative electrode current collector may adopt a metal foil or a composite current collector. For example, a copper foil may be used as the metal foil. The composite current collector may include a high molecular material substrate layer and a metal layer formed on at least one surface of the high molecular material substrate. The composite current collector may be formed by forming a metal material (such as copper, a copper alloy, nickel, a nickel alloy, titanium, a titanium alloy, silver and a silver alloy) on the high molecular material substrate. The high molecular material substrate includes a substrate such as polypropylene (PP), polyethylene terephthalate (PET), polybutylene terephthalate (PBT), polystyrene (PS), and polyethylene (PE).

In some of these embodiments, the negative electrode plate further optionally includes: a second negative electrode active material layer; and the second negative electrode active material layer includes a second negative electrode active material, and the second negative electrode active material includes at least one of graphite, soft carbon, hard carbon, a tin-based material, lithium titanate, and a silicon-containing active material.

Furthermore, in the second negative electrode active material layer, a mass percentage of the silicon-containing active material is less than 30%.

Preferably, the second negative electrode active material is graphite.

In some of these embodiments, the second negative electrode active material layer is arranged between the first negative electrode active material layer and the negative electrode current collector; or, the second negative electrode active material layer is arranged on a surface of the first negative electrode active material layer far away from the negative electrode current collector. Preferably, the second negative electrode active material layer is arranged on the surface of the first negative electrode active material layer far away from the negative electrode current collector. By arranging the second negative electrode active material layer on the surface of the first negative electrode active material layer far away from the negative electrode current collector, the cycle expansion rate of the negative electrode plate can be further reduced, and the cycling performance of the battery can be improved.

It may be understood that the quantity of the second negative electrode active material layer is at least one, and the at least one second negative electrode active material layer is arranged on the surface of the first negative electrode active material layer far away from the negative electrode current collector. As an example, the quantity of the second negative electrode active material layer is n, when n=1, the first negative electrode active material layer is arranged on the surface of the current collector, and the second negative electrode active material layer is arranged on the surface of the first negative electrode active material layer far away from the negative electrode collector; and when n>1, at least one second negative electrode active material layer is arranged on the surface of the first negative electrode active material layer far away from the negative electrode current collector. Through the structure arrangement above, it is avoided to arrange the first negative electrode active material layer on an outer surface of the negative electrode plate, which can further reduce the cycle expansion rate of the negative electrode plate and improve the cycling performance of the negative electrode plate.

In some of these embodiments, the second negative electrode active material layer further optionally includes a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some of these embodiments, the second negative electrode active material layer further optionally includes a conductive agent. The conductive agent may be selected from at least one of superconducting carbon, acetylene black, carbon black, ketjen black, carbon dots, carbon nanotubes, graphene and carbon nanofiber.

In some of these embodiments, the second negative electrode active material layer further optionally includes other additives, such as a thickener (such as sodium carboxymethylcellulose (CMC-Na)).

Another implementation of the present application further provides a preparation method of a negative electrode plate, including the following steps S1-S2.

Step S1, a silicon-based material, a conductive agent and a binder are prepared into negative electrode slurry.

In some of these embodiments, step S1 is specifically: the silicon-based material, the conductive agent and a dispersing agent (30 wt %-50 wt % of the total amount of the dispersing agent) are dry mixed in a vacuum stirrer, then deionized water is added for kneading evenly, then the remaining dispersing agent and the deionized water are added and stirred evenly under vacuum, and then the binder is added and stirred evenly under vacuum to prepare the negative electrode slurry.

Step S2, the negative electrode slurry is coated on at least one surface of a negative electrode current collector, and the coated negative electrode slurry is dried to prepare a first negative electrode active material layer, wherein components of the first negative electrode active material layer include, by mass: 30%-70% of the silicon-based material, 15%-40% of the binder and 15%-40% of the conductive agent.

In some of these embodiments, the components of the first negative electrode active material layer further include 0.5%-2% of the dispersing agent.

In some of these embodiments, the coating and drying process in step S2 is specifically: the negative electrode slurry is subjected to extrusion coating on the negative electrode current collector at a rate of 1 m/min-4 m/min, and then the negative electrode slurry is baked at 80° C.-120° ° C. for 10 min-20 min.

In addition, a secondary battery, a battery module, a battery pack and an electrical apparatus of the present application are illustrated hereafter with appropriate reference to the accompanying drawings.

In an implementation of the present application, a secondary battery is provided.

Generally, the secondary battery includes a positive electrode plate, a negative electrode plate, an electrolyte, and a separator. In charging and discharging processes of a battery, active ions are intercalated and deintercalated back and forth between the positive electrode plate and the negative electrode plate. The electrolyte plays a role in conducting the ions between the positive electrode plate and the negative electrode plate. The separator is arranged between the positive electrode plate and the negative electrode plate, and mainly plays a role in preventing a short circuit between a positive electrode and a negative electrode while allowing the ions to pass through.

Negative Electrode Plate

The negative electrode plate includes a negative electrode current collector and a negative electrode active material layer arranged on at least one surface of the negative electrode current collector, and the negative electrode active material layer includes a negative electrode active material. In implementations of the present application, the negative electrode plate adopts the negative electrode plate provided by the first aspect of the present application.

Positive Electrode Plate

The positive electrode plate includes a positive electrode current collector and a positive electrode active material layer arranged on at least one surface of the positive electrode current collector, and the positive electrode active material layer includes a positive electrode active material.

As an example, the positive electrode current collector has two surfaces opposite in its own thickness direction, and the positive electrode active material layer is arranged on either one or both of the two opposite surfaces of the positive electrode current collector.

In some of these embodiments, the positive electrode current collector may adopt a metal foil or a composite current collector. For example, an aluminum foil may be used as the metal foil. The composite current collector may include a high molecular material substrate layer and a metal layer formed on at least one surface of the high molecular material substrate layer. The composite current collector may be formed by forming a metal material (such as aluminum, an aluminum alloy, nickel, a nickel alloy, titanium, a titanium alloy, silver and a silver alloy) on a high molecular material substrate (such as polypropylene (PP), polyethylene terephthalate (PET), polybutylene terephthalate (PBT), polystyrene (PS), and polyethylene (PE)).

In some of these embodiments, the positive electrode active material may adopt a positive electrode active material for the battery well known in the art. As an example, the positive electrode active material may include at least one of the following materials: lithium-containing phosphate with an olivine structure, a lithium transition metal oxide, and their respective modified compounds. However, the present application is not limited to these materials, and other conventional materials useful as positive electrode active materials for batteries can also be used. It is possible to use only one of these positive electrode active materials alone, or to use more than two in combination. Here, examples of the lithium transition metal oxide may include, but are not limited to, at least one of a lithium-cobalt oxide (such as $LiCoO_2$), a lithium-nickel oxide (such as $LiNiO_2$), a lithium-manganese oxide (such as $LiMnO_2$ and $LiMn_2O_4$), a lithium-nickel-cobalt oxide, a lithium-manganese-cobalt oxide, a lithium-nickel-manganese oxide, a lithium-nickel-cobalt-manganese oxide (such as $LiN_{1/3}Co_{1/3}Mn_{1/3}O_2$ (also abbreviated as NCM333), $LiNi_{0.5}Co_{0.2}Mn_{0.3}O_2$ (also abbreviated as NCM523), $LiNi_{0.5}Co_{0.25}Mn_{0.25}O_2$ (also abbreviated as NCM211), $LiNi_{0.6}Co_{0.2}Mn_{0.2}O_2$ (also abbreviated as NCM622), and $LiNi_{0.8}Co_{0.1}Mn_{0.1}O_2$ (also abbreviated as NCM811)), a lithium-nickel-cobalt-aluminum oxide (such as $LiNi_{0.85}Co_{0.15}Al_{0.05}O_2$) and their respective modified compounds. Examples of the lithium-containing phosphate with the olivine structure may include, but are not limited to, at least one of lithium iron phosphate (such as $LiFePO_4$ (also abbreviated as LFP)), a lithium iron phosphate-carbon composite material, lithium manganese phosphate (such as $LiMnPO_4$), a lithium manganese phosphate-carbon composite, lithium manganese iron phosphate, and a lithium manganese iron phosphate-carbon composite material.

In some of these embodiments, the positive electrode active material layer further optionally includes a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and fluorinated acrylate resin.

In some of these embodiments, the positive electrode active material layer further optionally includes a conductive agent. As an example, the conductive agent may include at least one of superconducting carbon, acetylene black, carbon black, ketjen black, carbon dots, carbon nanotubes, graphene, and carbon nanofiber.

In some of these embodiments, the positive electrode plate may be prepared by in the following modes: dispersing the components for preparing the positive electrode plate, for example, the positive electrode active material, the conductive agent, the binder and any other components in a solvent (for example, N-methyl pyrrolidone) to form positive electrode slurry; and coating the positive electrode slurry on a positive electrode current collector, followed by oven drying, cold pressing and other procedures, to obtain the positive electrode plate.

Electrolyte

The electrolyte plays a role in conducting the ions between the positive electrode plate and the negative electrode plate. The type of the electrolyte is not particularly limited in the present application, and can be selected according to requirements. For example, the electrolyte may be in a liquid state, a gel state, or an all-solid state.

In some of these embodiments, the electrolyte adopts an electrolyte solution. The electrolyte solution includes an electrolyte salt and a solvent.

In some of these embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalato)borate, lithium difluoro bis(oxalato)phosphate, lithium and tetrafluoro(oxalato)phosphate.

In some of these embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate ethyl propionate, propyl propionate, methyl butyrate, ethyl butyrate, 1,4-butyrolactone, sulfolane, dimethyl sulfone, ethyl methyl sulfone and diethyl sulfone.

In some of these embodiments, the electrolyte solution further optionally includes an additive. For example, the additive may include a negative electrode film-forming additive, a positive electrode film-forming additive, and may further include an additive that can improve certain battery properties, such as an additive that improves battery overcharge performance, an additive that improves battery high temperature or low temperature performance, and the like.

Separator

In some of these embodiments, the secondary battery further includes the separator. The type of the separator is not particularly limited in the present application, and any well-known separator with a porous structure having good chemical stability and mechanical stability may be selected.

In some of these embodiments, the material of the separator may be selected from at least one of glass fiber, non-woven cloth, polyethylene, polypropylene, and polyvinylidene fluoride. The separator may be a single-layer film or a multi-layer composite film, which is not particularly limited. When the separator is the multi-layer composite film, the material of each layer may be the same or different, which is not particularly limited.

In some of these embodiments, the positive electrode plate, the negative electrode plate and the separator may be prepared into an electrode assembly by a winding process or a stacking process.

In some of these embodiments, the secondary battery may include an outer package. The outer package can be used to encapsulate the above-mentioned electrode assembly and electrolyte.

In some of these embodiments, the outer package of the secondary battery may be a hard shell, such as a hard plastic shell, an aluminum shell and a steel shell. The outer package of the secondary battery may also be a soft pack, such as a bag-type soft pack. A material of the soft package may be plastic, and as plastic, polypropylene, polybutylene terephthalate, and polybutylene succinate may be enumerated.

The present application has no particular limitation on the shape of the secondary battery, which may be cylindrical, square or any other shape. For example, FIG. 1 shows secondary battery 5 with a square structure as an example.

Figure 2:
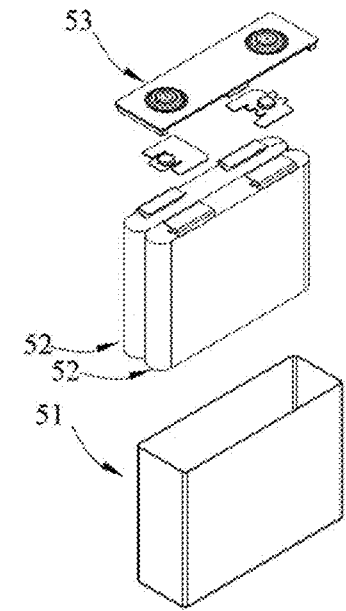
FIG. 2 is an exploded view of a secondary battery according to an implementation of the present application shown in FIG. 1.

In some of these embodiments, referring to FIG. 2, the outer package may include case 51 and cover plate 53. Here, case 51 may include a bottom plate and a side plate connected to the bottom plate, with the bottom plate and the side plate enclosing to form an accommodating cavity. The case 51 has an opening in communication with the accommodating cavity, and the cover plate 53 can cover the opening to close the accommodating cavity. The positive electrode plate, the negative electrode plate, and the separator may be formed into electrode assembly 52 by a winding process or a stacking process. The electrode assembly 52 is encapsulated within the accommodating cavity. The electrolyte solution impregnates the electrode assembly 52. The quantity of electrode assemblies 52 contained in secondary battery 5 may be one or more, which can be selected by those skilled in the art according to specific actual requirements.

In some of these embodiments, the secondary batteries may be assembled into a battery module, and the quantity of the secondary battery contained in the battery module may be one or more, and the specific quantity may be selected by those skilled in the art according to the application and capacity of the battery module.

Figure 3:
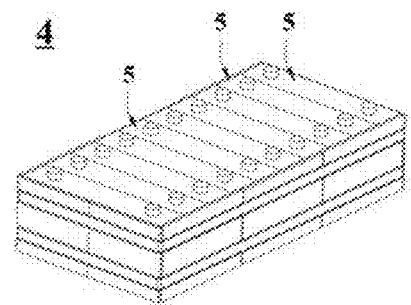
FIG. 3 is a schematic diagram of a battery module according to an implementation of the present application.

FIG. 3 shows battery module 4 as an example. Referring to FIG. 3, in the battery module 4, a plurality of secondary batteries 5 can be sequentially arranged along the length direction of the battery module 4. Of course, any other arrangements are also possible. The plurality of secondary batteries 5 may further be fixed by fasteners.

Optionally, battery module 4 may further include a case having an accommodating space, in which the plurality of secondary batteries 5 are accommodated.

In some of these embodiments, the above battery module may further be assembled into a battery pack, the quantity of the battery module contained in the battery pack may be one or more, and the specific quantity may be selected by those skilled in the art according to the use and capacity of the battery pack.

Figure 4:
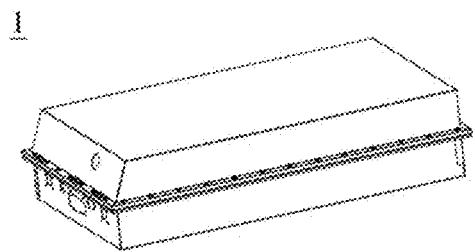
FIG. 4 is a schematic diagram of a battery pack according to an implementation of the present application.
Figure 5:
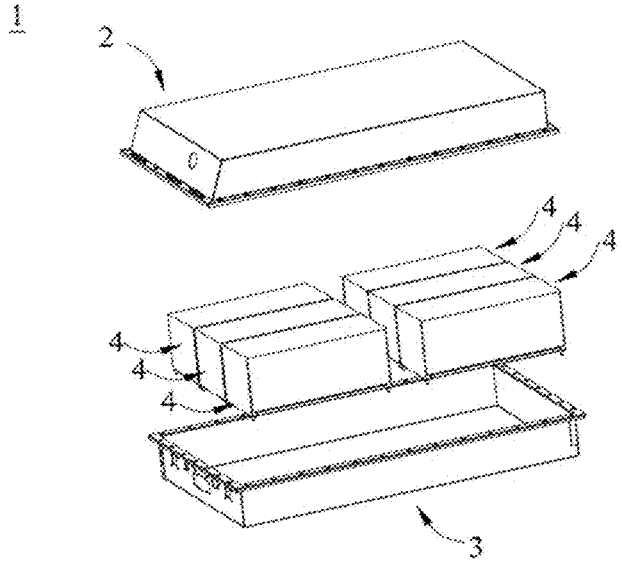
FIG. 5 is an exploded view of a battery pack according to an implementation of the present application shown in FIG. 4.

FIGS. 4 and 5 show battery pack 1 as an example. Referring to FIGS. 4 and 5, battery pack 1 may include a battery box and a plurality of battery modules 4 arranged in the battery box. The battery box includes upper box body 2 and lower box body 3, the upper box body 2 can cover the lower box body 3 to form a closed space for accommodating the battery modules 4. The plurality of the battery modules 4 may be arranged in the battery box in any manner.

In addition, the present application further provides an electrical apparatus, and the electrical apparatus includes at least one of the secondary battery, the battery module, or the battery pack provided in the present application. The secondary battery, the battery module, or the battery pack may be used as a power source for the electrical apparatus, and may also be used as an energy storage unit for the electrical apparatus. The electrical apparatus may include a mobile device, an electric vehicle, an electric train, a ship and satellite, an energy storage system, etc., but are not limited thereto. The mobile device, for example, may be a mobile phone, a laptop, etc; the electric vehicle, for example, may be an all-electric vehicle, a hybrid electric vehicle, a plug-in hybrid electric vehicle, an electric bicycle, an electric scooter, an electric golf cart, an electric truck, etc., but are not limited thereto.

For the electrical apparatus, the secondary battery, the battery module, or the battery pack may be selected according to its use requirements.

Figure 6:
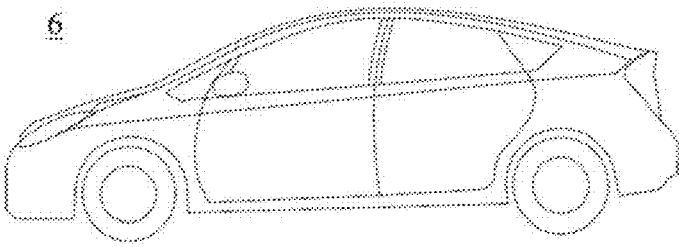
FIG. 6 is a schematic diagram of an electrical apparatus in which a secondary battery is used as a power source according to an implementation of the present application.

FIG. 6 shows electrical apparatus 6 as an example. The electrical apparatus 6 is a, all-electric vehicle, a hybrid electric vehicle, or a plug-in hybrid electric vehicle, etc. In order to meet the requirements of the electrical apparatus for high power and high energy density of the secondary battery, the battery pack or the battery module may be used.

As another example, the apparatus may be a mobile phone, a tablet, a laptop, etc. The apparatus is generally required to be light and thin, and may use a secondary battery as a power source.

EXAMPLES

Examples of the present application will be illustrated hereinafter. The examples described below are exemplary and only used to explain the present application, and are not to be construed as limiting the present application. Where specific techniques or conditions are not specified in the examples, the techniques or conditions described in the literatures of the art or the product specifications are followed. All of the used agents or instruments which are not specified with the manufacturer are conventional commercially-available products.

Example 1

Preparation of a negative electrode plate in Example 1: silicon monoxide, a binder, a dispersing agent (CMC-Na), and a conductive agent are fully stirred and mixed in deionized water at a mass ratio of 45%:20.4%: 1.2%:33.4%, and prepared into negative electrode slurry. Dv50 of the silicon monoxide is 6.8 μm, and the binder is styrene butadiene rubber (SBR) and polyacrylic acid (PAA) with a mass ratio of 94%:6%. The conductive agent is artificial graphite, conductive carbon black (Super-P, SP) and carbon nanotubes (CNT) with a mass ratio of 96.1%:3%:0.9%. Dv50 of the artificial graphite is 3.5 μm. The above slurry is evenly coated on a copper current collector with a thickness of 8 μm by extrusion coating, and is subjected to oven drying, cold pressing and slitting to obtain a negative electrode plate with compacted density being 1.65 g/cm$^3$ and a coating weight being 5.19 mg/cm$^2$.

Figure 7:
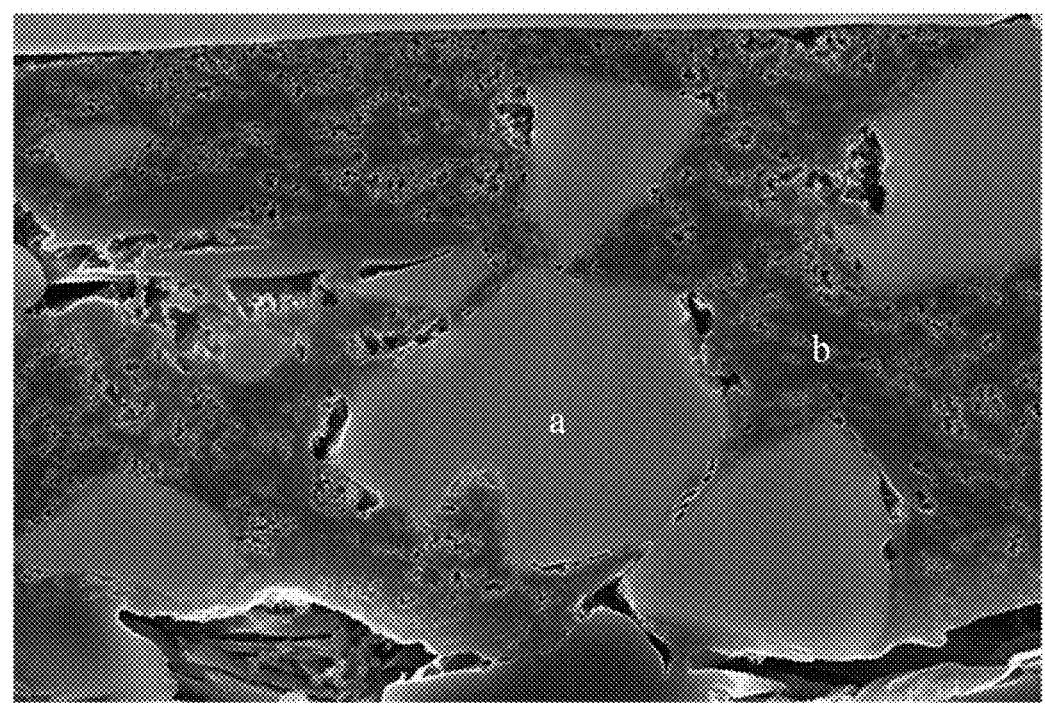
FIG. 7 is a cross-sectional scanning electron microscope (SEM) view of a negative electrode plate of Example 1 of the present application, wherein, a represents a silicon-based material, and b represents a porous conductive network.

Referring to FIG. 7, which is a cross-sectional scanning electron microscope (SEM) view of the negative electrode plate of Example 1, from which a silicon-based material (a) and a porous conductive network (b) of a first negative electrode active material layer may be observed, the porous conductive network has a rich pore structure, and particles of the silicon-based material are dispersed in the porous conductive network.

Composition ratios of the negative electrode plates of Examples 1-25 and Comparative Examples 1-4 are recorded in Table 1.

TABLE 1

| | Composition ratios of the negative electrode plates of Examples 1-25 and Comparative Examples 1-4 | | | | | | | |
|---|---|---|---|---|---|---|---|---|
| Serial Number | Mass proportion of silicon-based material in silicon-based coating layer (%) | Dv50 of silicon-based material | Mass proportion of a binder in the silicon-based coating layer (%) | Types of binders in the silicon-based coating layer | Mass proportion of different binders in the total amount of binders (%) | Mass proportion of a conductive agent in the silicon-based coating layer (%) | Types of conductive agents in the silicon-based coating layer | Mass proportion of different conductive agents in the total amount of conductive agents (%) |
| Example 1 | 45 | 6.8 μm | 20.4 | SBR + PAA | 94 + 6 | 33.4 | 3.5 μm artificial graphite + SP + CNT | 96.1 + 3 + 0.9 |
| Example 2 | 50 | 6.8 μm | 23.4 | SBR + PAA | 94 + 6 | 25.4 | 3.5 μm artificial graphite + SP + CNT | 96.1 + 3 + 0.9 |
| Example 3 | 45.8 | 6.8 μm | 18 | SBR + PAA | 94 + 6 | 35 | 3.5 μm artificial graphite + SP + CNT | 96.1 + 3 + 0.9 |

TABLE 1-continued

Composition ratios of the negative electrode plates of Examples 1-25 and Comparative Examples 1-4

| Serial Number | Mass proportion of silicon-based material in silicon-based coating layer (%) | Dv50 of silicon-based material | Mass proportion of a binder in the silicon-based coating layer (%) | Types of binders in the silicon-based coating layer | Mass proportion of different binders in the total amount of binders (%) | Mass proportion of a conductive agent in the silicon-based coating layer (%) | Types of conductive agents in the silicon-based coating layer | Mass proportion of different conductive agents in the total amount of conductive agents (%) |
|---|---|---|---|---|---|---|---|---|
| Example 4 | 30 | 6.8 μm | 39.4 | SBR + PAA | 94 + 6 | 39.4 | 3.5 μm artificial graphite + SP + CNT | 96.1 + 3 + 0.9 |
| Example 5 | 40 | 6.8 μm | 29.8 | SBR + PAA | 94 + 6 | 29 | 3.5 μm artificial graphite + SP + CNT | 96.1 + 3 + 0.9 |
| Example 6 | 60 | 6.8 μm | 19.4 | SBR + PAA | 94 + 6 | 19.4 | 3.5 μm artificial graphite + SP + CNT | 96.1 + 3 + 0.9 |
| Example 7 | 68.8 | 6.8 μm | 15 | SBR + PAA | 94 + 6 | 15 | 3.5 μm artificial graphite + SP + CNT | 96.1 + 3 + 0.9 |
| Example 8 | 45 | 6.8 μm | 20.4 | SBR + PAA | 90 + 10 | 33.4 | 3.5 μm artificial graphite + SP + CNT | 96.1 + 3 + 0.9 |
| Example 9 | 45 | 6.8 μm | 20.4 | SBR | 100 | 33.4 | 3.5 μm artificial graphite + SP + CNT | 96.1 + 3 + 0.9 |
| Example 10 | 45 | 6.8 μm | 20.4 | SBR + PAA | 80 + 20 | 33.4 | 3.5 μm artificial graphite + SP + CNT | 96.1 + 3 + 0.9 |
| Example 11 | 45 | 1 μm | 20.4 | SBR + PAA | 94 + 6 | 33.4 | 3.5 μm artificial graphite + SP + CNT | 96.1 + 3 + 0.9 |
| Example 12 | 45 | 10 μm | 20.4 | SBR + PAA | 94 + 6 | 33.4 | 3.5 μm artificial graphite + SP + CNT | 96.1 + 3 + 0.9 |
| Example 13 | 45 | 15 μm | 20.4 | SBR + PAA | 94 + 6 | 33.4 | 3.5 μm artificial graphite + SP + CNT | 96.1 + 3 + 0.9 |
| Example 14 | 45 | 6.8 μm | 20.4 | SBR + PAA | 94 + 6 | 33.4 | 1 μm artificial graphite + SP + CNT | 96.1 + 3 + 0.9 |
| Example 15 | 45 | 6.8 μm | 20.4 | SBR + PAA | 94 + 6 | 33.4 | 10 μm artificial graphite + SP + CNT | 96.1 + 3 + 0.9 |
| Example 16 | 45 | 6.8 μm | 20.4 | SBR + PAA | 94 + 6 | 33.4 | 20 μm artificial graphite + SP + CNT | 96.1 + 3 + 0.9 |
| Example 17 | 45 | 6.8 μm | 20.4 | SBR + PAA | 94 + 6 | 33.4 | 3.5 μm artificial graphite | 100 |
| Example 18 | 45 | 6.8 μm | 20.4 | SBR + PAA | 94 + 6 | 33.4 | SP | 100 |
| Example 19 | 45 | 6.8 μm | 20.4 | SBR + PAA | 94 + 6 | 33.4 | 3.5 μm artificial graphite + SP + CNT | 75 + 21 + 4 |
| Example 20 | 45 | 6.8 μm | 20.4 | SBR + PAA | 94 + 6 | 33.4 | 3.5 μm artificial graphite + SP + CNT | 85 + 14 + 1 |
| Example 21 | 45 | 6.8 μm | 20.4 | SBR + PAA | 94 + 6 | 33.4 | 3.5 μm artificial graphite + SP + CNT | 90 + 4 + 6 |

TABLE 1-continued

Composition ratios of the negative electrode plates of Examples 1-25 and Comparative Examples 1-4

| Serial Number | Mass proportion of silicon-based material in silicon-based coating layer (%) | Dv50 of silicon-based material | Mass proportion of a binder in the silicon-based coating layer (%) | Types of binders in the silicon-based coating layer | Mass proportion of different binders in the total amount of binders (%) | Mass proportion of a conductive agent in the silicon-based coating layer (%) | Types of conductive agents in the silicon-based coating layer | Mass proportion of different conductive agents in the total amount of conductive agents (%) |
|---|---|---|---|---|---|---|---|---|
| Example 22 | 45 | 6.8 μm | 20.4 | SBR + PAA | 94 + 6 | 33.4 | 3.5 μm artificial graphite + SP + CNT | 95 + 1 + 4 |
| Example 23 | 45 | 6.8 μm | 20.4 | SBR + PAA | 94 + 6 | 33.4 | 3.5 μm artificial graphite + SP + CNT | 85 + 5 + 10 |
| Example 24 | A negative electrode plate in the present example is of a double-layer structure. A first layer is a low silicon-based coating layer arranged on the surface of a current collector and having components consistent with that of Example 1. A second layer is a pure graphite layer coated on the surface of the first layer, wherein the mass proportion of the silicon-based material in the negative electrode plate is 15% | | | | | | | |
| Example 25 | A negative electrode plate in the present example is of a double-layer structure. A first layer is a pure graphite layer coated on the surface of a current collector and having components consistent with that of the second layer in Example 24. A second layer is a silicon-based coating layer arranged on the surface of the first layer and having components consistent with that of Example 1, wherein the mass proportion of the silicon-based material in the negative electrode plate is 15% | | | | | | | |
| Comparative Example 1 | 45 | 6.8 | 23 | SBR + PAA | 65.2 + 34.8 | 51.5 | 3.5 μm artificial graphite + SP + CNT | 96.1 + 3 + 0.9 |
| Comparative Example 2 | 45 | 6.8 | 50 | SBR + PAA | 94 + 6 | 5 | 3.5 μm artificial graphite + SP + CNT | 96.1 + 3 + 0.9 |
| Comparative Example 3 | 15 | 6.8 | 2.3 | SBR + PAA | 65.2 + 34.8 | 81.5 | 3.5 μm artificial graphite + SP + CNT | 96.1 + 3 + 0.9 |
| Comparative Example 4 | A negative electrode plate in the present example is of a double-layer structure. A first layer is a coating layer in Comparative Example 1 and arranged on the surface of a current collector. A second layer is a pure graphite layer arranged on the surface of the first layer and having components consistent with that of the second layer in Example 24, wherein the mass proportion of the silicon-based material in the negative electrode plate is 15% | | | | | | | |

Examples 2-7

The difference between the negative electrode plates of Examples 2-7 and Example 1 is that the mass ratios of silicon monoxide, the binder, and the conductive agent are different.

Example 8

The difference between Example 8 and Example 1 is that the binder is styrene butadiene rubber (SBR) and polyacrylic acid (PAA) with a mass ratio of 90%:10%.

Example 9

The difference between Example 9 and Example 1 is that the binder is styrene butadiene rubber (SBR).

Example 10

The difference between Example 10 and Example 1 is that the binder is styrene butadiene rubber (SBR) and polyacrylic acid (PAA) with a mass ratio of 80%:20%.

Examples 11-13

The difference between Examples 11-13 and Example 1 is that Dv50 of the silicon monoxide is different.

Examples 14-16

The difference between Examples 14-16 and Example 1 is that Dv50 of the artificial graphite in the conductive agent is different.

Example 17

The difference between Example 17 and Example 1 is that the conductive agent is artificial graphite of 3.5 μm.

Example 18

The difference between Example 18 and Example 1 is that the conductive agent is conductive carbon black (Super-P, SP).

Examples 19-23

The difference between Examples 19-23 and Example 1 is that the ratios of the artificial graphite, the conductive carbon black (Super-P, SP), and the carbon nanotubes (CNT) in the conductive agent are different.

Example 24

Preparation of the negative electrode plate in Example 24:

First negative electrode slurry: silicon monoxide, a binder, a dispersing agent (CMC-Na), and a conductive agent are fully stirred and mixed in deionized water at a mass ratio of 45%:20.4%: 1.2%:33.4%, and prepared into the first negative electrode slurry. Dv50 of the silicon monoxide is 6.8 μm, and the binder is styrene butadiene rubber (SBR) and polyacrylic acid (PAA) with a mass ratio of 94%:6%. The conductive agent is artificial graphite, conductive carbon black (Super-P, SP) and carbon nanotubes (CNT) with a mass ratio of 96.1%:3%:0.9%. Dv50 of the artificial graphite is 3.5 μm.

Second negative electrode slurry: the artificial graphite, the binder (SBR), the dispersing agent (CMC-Na), and the conductive carbon black (Super-P, SP) are fully stirred and mixed in deionized water at a mass ratio of 96.2%: 1.8%: 1.2%:0.8%, and prepared into the second negative electrode slurry, wherein Dv50 of the artificial graphite is 14.3 μm.

The first negative electrode slurry is coated evenly on a copper current collector with a thickness of 8 μm by using a double-chamber extrusion coating device to form a first negative electrode active material layer, and meanwhile, the second negative electrode slurry is uniformly coated on the first negative electrode active material layer to form a second negative electrode active material layer, and subjected to oven drying, cold pressing and slitting, to obtain the negative electrode plate with a compacted density of 1.65 g/cm³ and a coating weight of 8.37 mg/cm², wherein, the mass proportion of the silicon monoxide in the negative electrode active material layer is 15%.

Example 25

The difference between Example 25 and Example 24 is that the second negative electrode slurry of Example 24 is used to be coated on the current collector to form the second negative electrode active material layer, and the first negative electrode slurry of Example 24 is used to be coated on the second negative electrode active material layer to form the first negative electrode active material layer, and the composition remains unchanged, wherein the mass proportion of the silicon monoxide in an electrode plate coating layer is 15%.

Comparative Example 1

The difference between Comparative Example 1 and Example 1 is that a mass proportion of a binder is 2.3%, a mass proportion of a conductive agent is 51.5%, wherein a mass ratio of SBR to PAA is 65.2%:34.8%. The composition of a negative electrode plate in Comparative Example 1 is a common ratio of a traditional silicon-containing negative electrode plate.

Figure 8:
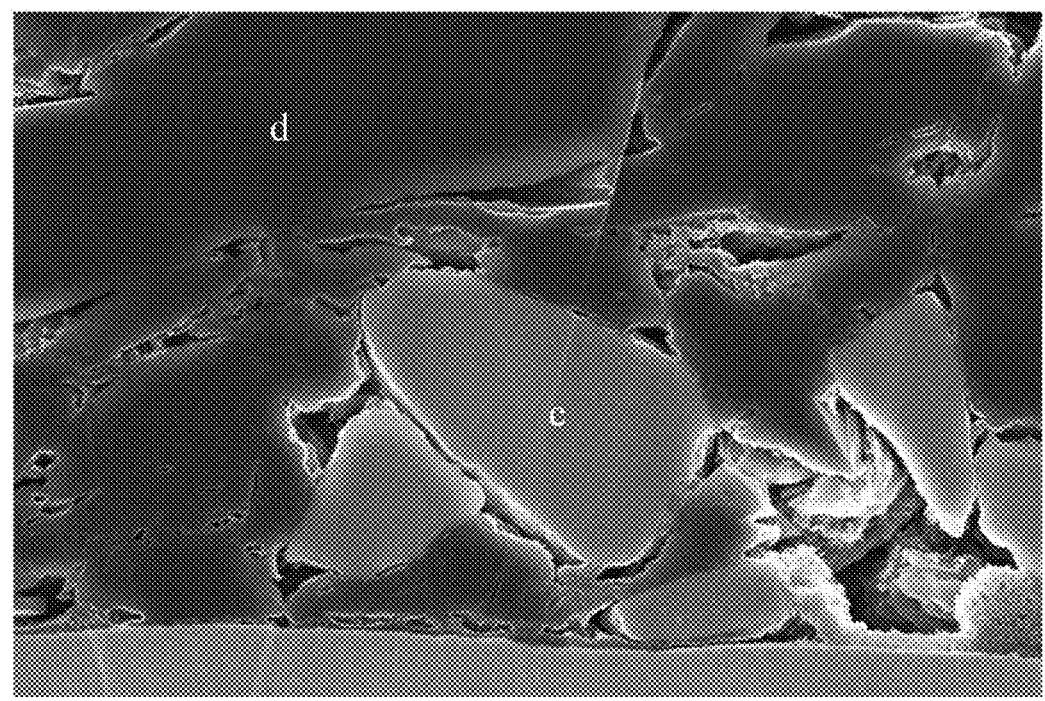
FIG. 8 is a cross-sectional scanning electron microscope (SEM) view of a negative electrode plate of comparative example 1 of the present application, wherein, c represents a silicon-based material, and d represents a conductive agent.

Referring to FIG. 8, which is a cross-sectional scanning electron microscope (SEM) view of the negative electrode plate of Comparative Example 1, a silicon-based material (c) and the conductive agent (d, mainly graphite) in a first negative electrode active material layer may be observed from the figure, a small amount of binder is dispersed in the first negative electrode active material layer, and its distribution is difficult to observe. Different from the negative electrode plate of Example 1, the conductive agent in the negative electrode plate of Comparative Example 1 is distributed in a block shape, and no porous structure is observed.

Comparative Example 2

The difference between Comparative Example 2 and Example 1 is that the mass proportion of the binder is 48.8%, and the mass proportion of the conductive agent is 5%.

Comparative Example 3

The difference between Comparative Example 3 and Example 1 is that a mass proportion of silicon monoxide is 15%, the mass proportion of the binder is 2.3%, the mass proportion of the conductive agent is 81.5%, wherein the mass ratio of SBR to PAA is 65.2%:34.8%.

Comparative Example 4

The difference between Comparative Example 4 and Example 24 is that the first negative electrode slurry arranged on the surface of a current collector is a slurry composition of Comparative Example 1, and other components remain unchanged, wherein the mass proportion of silicon monoxide in the electrode plate active material layer is 15%.

Preparation of a Positive Electrode Plate:

positive electrode active material $LiNi_{0.8}Co_{0.1}Mn_{0.1}O_2$ (NCM811), the binder polyvinylidene fluoride (PVDF) and the conductive agent acetylene black in a mass ratio of 97%: 1.5%:1.5% are dissolved in solvent N-methyl pyrrolidone (NMP), fully stirred and mixed evenly to prepare positive electrode slurry; and the positive electrode slurry is evenly coated on a positive electrode current collector aluminum foil, and then subjected to oven drying, cold pressing and slitting to obtain the positive electrode plate.

A polypropylene film is used as the separator.

Preparation of an Electrolyte Solution:

ethylene carbonate (EC), ethyl methyl carbonate (EMC) and diethyl carbonate (DEC) are mixed in a volume ratio of 1:1:1, and $LiPF_6$ is dissolved evenly in the above solution to obtain the electrolyte solution. In this electrolyte solution, concentration of $LiPF_6$ is 1 mol/L.

Preparation of a Secondary Battery:

the positive electrode plate, the separator and a negative electrode plate are stacked in sequence and wound to obtain an electrode assembly; and the electrode assembly is placed in an outer package, poured with the electrolyte solution prepared above, and subjected to packaging, standing, formation, aging and other procedures to obtain the secondary battery.

Testing Part:

Ion-Polished Section Morphology Analysis of the Negative Electrode Plate (CP):

argon ionization produces argon ions, and after accelerated focusing, atoms or molecules on a sample surface are knocked out to realize ion polishing and prepare a negative electrode plate section sample. A scanning electron microscope (SEM) (such as ZEISS Sigma 300) is used to take pictures of the section of the negative electrode plate. Reference standard: JY/T010-1996 "General Rules for Analytical Scanning Electron Microscopy". By analyzing and calculating an area ratio of a silicon-based material in a unit area image, the rest is a porous conductive network, and an area ratio of the silicon-based material to the porous conductive network may be calculated.

Internal Resistance Test of the Secondary Battery:

An internal resistance of the secondary battery is measured by a battery internal resistance tester (an ATS21 model of an Applent Company). A probe of the battery internal resistance tester is clamped to terminal posts on both sides of the secondary battery for 5 seconds, and then a resistance value is read after the tester shows a stable value.

Cycling Performance Test of the Secondary Battery at 45° C.:

the secondary battery is charged at a constant current rate of 1 C in a constant temperature environment of 45° ° C. to a voltage of 4.25V, then is charged at a constant voltage of 4.25V until the current is less than or equal to 0.05 C, and is subjected to standing for 5 min, then the secondary battery is discharged at a constant current rate of 1 C to a voltage of 2.5V, and is subjected to standing for 5 min. This is a cycle of charging and discharging, and the discharging capacity of this cycle is recorded as the discharging capacity of the first cycle of the secondary battery. A cyclic charging and discharging test is performed on the secondary battery according to the above method until a battery cell capacity decays to 80%, and the number of cycles is recorded.

Electrode Plate Full-Charge Cycle Expansion Performance Test of the Secondary Battery at 45° C.:

an electrode plate thickness of the secondary battery when a cold pressing procedure is completed is recorded as h0, according to the above cycling performance test method of the secondary battery at 45° C., the secondary battery is cycled for 100 times, is charged at a constant current rate of 1 C to a voltage of 4.25V, then is charged at a constant voltage of 4.25V until the current is less than or equal to 0.05 C, and is subjected to standing for 5 min. At this time, the battery cell is in a fully charged state, and then the cycled battery cell is disassembled in a drying room. A thickness of the negative electrode plate after 100 cycles is recorded as $h100_{full\ charge}$, and the electrode plate 100-times full-charge cycle expansion rate of the secondary battery at 45° ° C. $\Delta h100_{full\ charge}(\%)=(h100_{full\ charge}-h0)/h0*100\%$.

Irreversible Cycling Expansion Performance Test of Electrode Plate for the Secondary Battery at 45° C.:

the electrode plate thickness of the secondary battery when the cold pressing procedure is completed is recorded as h0, according to the above cycling performance test method of the secondary battery at 45° C., the secondary battery is cycled for 100 times, is discharged at a rate of 0.1 C to 2.5V, and is subjected to standing for 5 min. Then the cycled battery cell is disassembled in a drying room. A thickness of the negative electrode plate after 100 cycles is recorded as $h100_{full\ discharge}$, and an electrode plate 100-times irreversible cycle expansion rate of the secondary battery at 45° C. $\Delta h100_{irreversible}(\%)=(h100_{full\ discharge}-h0)/h0*100\%$.

22

TABLE 2

Electrochemical performance of the secondary batteries of Examples 1-25 and Comparative Examples 1-4.

| Serial Number | Area ratio of the silicon-based material to the porous conductive network | Internal resistance/mΩ | Number of cycles when the capacity decays to 80% | Full-charge cycle expansion rate at 100 cycles | Irreversible cycle expansion rate at 100 cycles |
|---|---|---|---|---|---|
| Example 1 | 1:1.1 | 6.3 | 658 | 91% | 17.8% |
| Example 2 | 1:1 | 6.6 | 601 | 90% | 18.1% |
| Example 3 | 1:1.1 | 6.3 | 645 | 97% | 19.3% |
| Example 4 | 1:1.5 | 6.7 | 720 | 71% | 14% |
| Example 5 | 1:1.3 | 6.8 | 668 | 79% | 15.4% |
| Example 6 | 1:0.9 | 7.4 | 510 | 110.5% | 25% |
| Example 7 | 1:0.8 | 7.7 | 473 | 150.1% | 33.2% |
| Example 8 | 1:1.1 | 6.3 | 586 | 94% | 18.4% |
| Example 9 | 1:1.1 | 6.3 | 580 | 92.1% | 16.3% |
| Example 10 | 1:1.1 | 6.4 | 480 | 94.2% | 20% |
| Example 11 | 1:1.1 | 6.2 | 620 | 95% | 18.3% |
| Example 12 | 1:1.1 | 6.7 | 603 | 96.3% | 19% |
| Example 13 | 1:1.1 | 7.1 | 584 | 99.2% | 19.5% |
| Example 14 | 1:1.1 | 6.2 | 604 | 91.3% | 18.1% |
| Example 15 | 1:1.1 | 7.2 | 542 | 90.5% | 17.5% |
| Example 16 | 1:1.1 | 7.8 | 489 | 91.2% | 18.4% |
| Example 17 | 1:1 | 8 | 502 | 94.5% | 18.7% |
| Example 18 | 1:1.2 | 6.6 | 427 | 89.5% | 17.9% |
| Example 19 | 1:1.1 | 6.1 | 547 | 90.3% | 18.2% |
| Example 20 | 1:1.1 | 6.3 | 586 | 91.1% | 18% |
| Example 21 | 1:1.1 | 6 | 618 | 90.7% | 18.5% |
| Example 22 | 1:1.1 | 6.1 | 630 | 91.4% | 18.3% |
| Example 24 | / | 6.4 | 1123 | 48.1% | 9.8% |
| Example 25 | / | 6.5 | 818 | 48.4% | 10.2% |
| Comparative Example 1 | / | 6.3 | 312 | 189% | 106% |
| Comparative Example 2 | / | 9.2 | 180 | 68.2% | 13.2% |
| Comparative Example 3 | / | 6.0 | 725 | 72.4% | 38% |
| Comparative Example 4 | / | 6.3 | 453 | 84.3% | 43.1% |

It can be seen from the relevant data in Table 2 that in the secondary batteries of Examples 1-22, the area ratio of the silicon-based material and the porous conductive network on the cross-section of the negative electrode plate is 1:(0.8-1.5), the internal resistance of the secondary battery is 6 mΩ to 8 mΩ, the number of cycles when the capacity decays to 80% is 427 to 720, the full-charge cycle expansion rate at 100 cycles is 71% to 150.1%, and the irreversible cycle expansion rate at 100 cycles is 14% to 33.2%.

The internal resistance of the secondary battery in Comparative Example 1 is 6.3 mΩ, the number of cycles when the capacity decays to 80% is 312, the full-charge cycle expansion rate at 100 cycles is 189%, and the irreversible cycle expansion rate at 100 cycles is 106%. Compared with the traditional silicon-containing negative electrode plate in Comparative Example 1, the secondary battery composed of the negative electrode plate of Examples 1-22 has the internal resistance close to that of Comparative Example 1, the cycling performance is better than that of the secondary battery of Comparative Example 1, and the full-charge cycle expansion rate and the irreversible cycle expansion rate are lower than those of Comparative Example 1, indicating that by adopting the negative electrode plate provided by the present application in Examples 1-22, the cycle expansion of the negative electrode plate can be effectively controlled, and the irreversible cycle expansion rate is lower, which indicates that the volume expansion of silicon in the negative electrode plate causes less irreversible deterioration to the negative electrode plate, and thus the secondary batteries of Examples 1-22 have the better cycling performance.

The content of CNT in the negative electrode slurry of Example 23 is relatively high, and when it is used to prepare the negative electrode slurry, the slurry is difficult to disperse, which is not conducive to the preparation of the negative electrode plate.

Among the secondary batteries in Examples 24-25, the internal resistance of the secondary batteries is 6.4 m$\Omega$ to 6.5 m$\Omega$, the number of cycles when the capacity decays to 80% is 818 to 1123, the full-charge cycle expansion rate at 100 cycles is 48.1% to 48.4%, and the irreversible cycle expansion rate at 100 cycles is 9.8% to 10.2%. In the negative electrode plate, the silicon-containing first negative electrode active material layer is compounded with the second negative electrode active material layer of pure graphite, the cycle expansion rate of the secondary battery is lower, and the cycling performance is better. Especially in Example 24, the silicon-containing first negative electrode active material layer is arranged between the negative electrode current collector and the second negative electrode active material layer, and the cycling performance is better.

Compared with Example 1, in the negative electrode plate of Comparative Example 2, the mass content of the binder reaches 48.8%, even with respect to the secondary battery of Comparative Example 1, the cycle expansion rate (the full-charge cycle expansion rate and the irreversible cycle expansion rate) of the secondary battery of Comparative Example 2 is significantly increased, but due to the high content of the binder, the internal resistance of the secondary battery is very large, and the cycling performance is still poor.

The negative electrode plate of Comparative Example 3 uses the conductive agent (mainly graphite) to replace part of the silicon monoxide, and the ratio of the binder is the same as that of Comparative Example 1. The negative electrode plate of Comparative Example 3 has the same content of silicon monoxide as the negative electrode plate of Example 24 or 25, but the cycle expansion rate is significantly higher than that of Example 24 or 25, and the cycling performance is not as good as that of Example 24 or 25.

The difference between Comparative Example 4 and Example 24 lies in the ratio of the first negative electrode active material layer, the number of cycles when the capacity of the secondary battery of Comparative Example 4 decays to 80% is 453, the full-charge cycle expansion rate at 100 cycles is 84.3%, and the irreversible cycle expansion rate at 100 cycles is 43.1%. It can be seen that when the negative electrode plate is of the double-layer active material layer structure, the volume expansion of the first negative electrode active material layer prepared by using the traditional silicon-containing active material layer ratio is more obvious, when being compounded with the negative electrode active material layer of the pure graphite, with respect to the secondary battery of Comparative Example 1, the cycling performance is improved, is obviously inferior to that of Example 24.

The technical features of the examples described above can be combined arbitrarily. In order to make the description concise, not all possible combinations of the technical features in the above examples are described. However, all the combinations of the technical features should be considered as falling within the scope recorded in this specification provided that they do not conflict with each other.

The above examples only express several implementations of the present application, and the description thereof is specific and detailed, but cannot therefore be understood as a limitation on the patent scope of the present disclosure. It should be noted that those of ordinary skilled in the art may further make variations and improvements without departing from the concept of the present application, all of which fall within the protection scope of the present application. Therefore, the patent protection scope of the present application should be subject to the appended claims.

What is claimed is:

1. A negative electrode plate, comprising:
a negative electrode current collector; and
a first negative electrode active material layer, arranged on at least one surface of the negative electrode current collector; wherein,
the first negative electrode active material layer comprises, by mass: 30% to 40% of a silicon-based material, 29.8% to 39.4% of a binder and 35% to 39.4% of a conductive agent, wherein the binder and the conductive agent form a porous conductive network; and the porous conductive network wraps the silicon-based material,
on a section perpendicular to a thickness direction of the first negative electrode active material layer, an area ratio of the silicon-based material to the porous conductive network is 1:(1.3-1.5);
wherein the silicon-based material comprises silicon monoxide,
the binder comprises styrene butadiene rubber and polyacrylic acid,
the conductive agent comprises artificial graphite, superconducting carbon, and carbon nanotubes;
wherein based on a total mass of the binder, a mass percentage of styrene butadiene rubber is between 90 and 100, and a mass percentage of the polyacrylic acid is between 0 and 10.

2. The negative electrode plate according to claim 1, wherein a volume particle size Dv50 of the silicon-based material is 1 μm to 15 μm.

3. The negative electrode plate according to claim 1, wherein the volume particle size Dv50 of the silicon-based material is 4 μm to 8 μm.

4. The negative electrode plate according to claim 1, wherein a glass transition temperature of the binder is less than or equal to 25° C.

5. The negative electrode plate according to claim 1, wherein a volume particle size Dv50 of the artificial graphite is 1 μm to 20 μm.

6. The negative electrode plate according to claim 1, wherein the volume particle size Dv50 of the artificial graphite is 2 μm to 4 μm.

7. The negative electrode plate according to claim 1, further comprising: a second negative electrode active material layer, wherein
the second negative electrode active material layer comprises a second negative electrode active material, and the second negative electrode active material comprises at least one of graphite, soft carbon, hard carbon, a tin-based material, lithium titanate, and a silicon-containing active material.

8. The negative electrode plate according to claim 7, wherein the second negative electrode active material is graphite.

9. The negative electrode plate according to claim 7, wherein the second negative electrode active material layer is arranged between the first negative electrode active material layer and the negative electrode current collector.

10. A secondary battery, comprising the negative electrode plate according to claim 1.

11. A preparation method of a negative electrode plate, comprising the following steps: preparing a silicon-based material, a conductive agent and a binder into negative electrode slurry; and coating the negative electrode slurry on at least one surface of a negative electrode current collector, and drying the coated negative electrode slurry to prepare a first negative electrode active material layer; wherein the first negative electrode active material layer comprise, by mass: 30% to 40% of the silicon-based material, 29.8% to 39.4% of the binder and 35% to 39.4% of the conductive agent, wherein the binder and the conductive agent form a porous conductive network; and the porous conductive network wraps the silicon-based material, on a section perpendicular to a thickness direction of the first negative electrode active material layer, an area ratio of the silicon-based material to the porous conductive network is 1:(1.3-1.5);

wherein the silicon-based material comprises silicon monoxide, the binder comprises styrene butadiene rubber and polyacrylic acid, the conductive agent comprises artificial graphite, superconducting carbon, and carbon nanotubes;

wherein based on a total mass of the binder, a mass percentage of styrene butadiene rubber is between 90 and 100, and a mass percentage of the polyacrylic acid is between 0 and 10.

* * * * *